Sept. 4, 1951  J. T. PHIPPS  2,566,994
RENEWABLE PUMP PISTON
Filed June 2, 1945
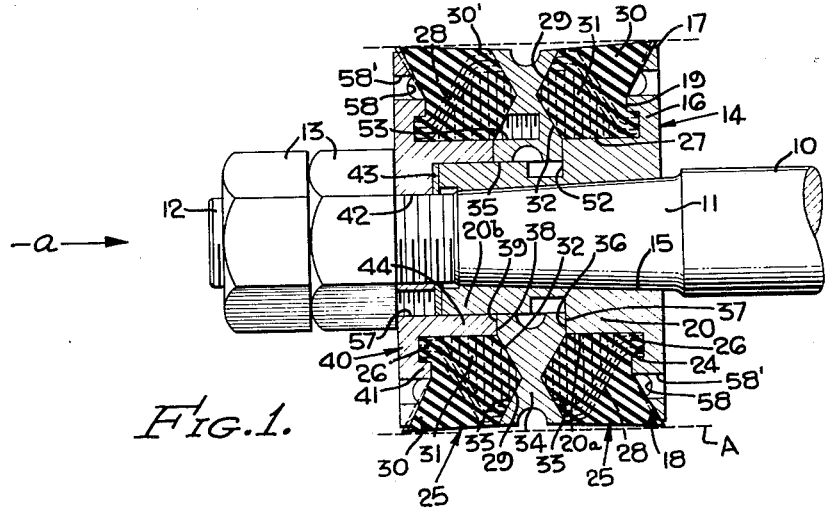
Fig. 1.
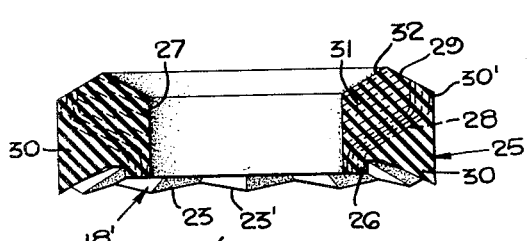
Fig. 2.
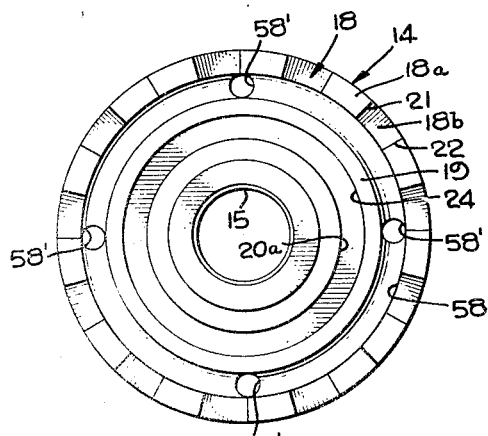
Fig. 3.
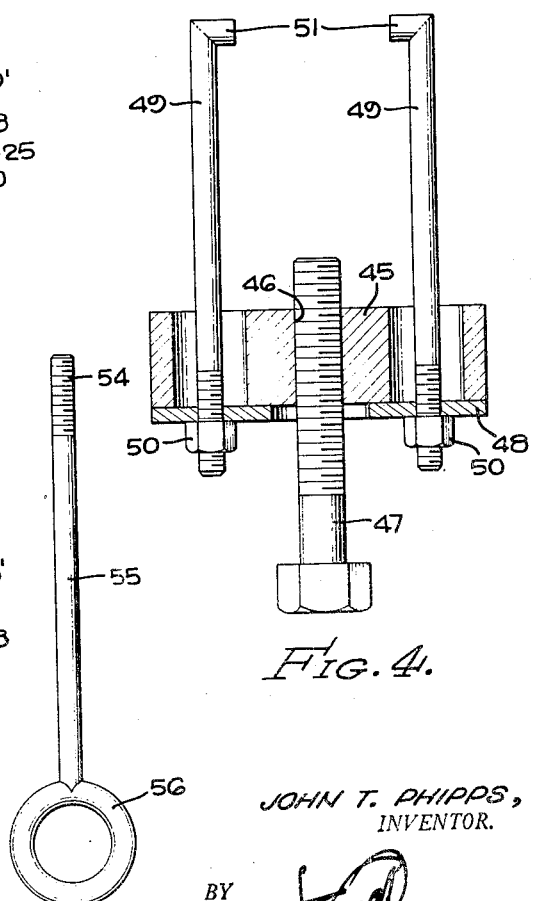
Fig. 4.
Fig. 5.
JOHN T. PHIPPS,
INVENTOR.
BY
ATTORNEY Patented Sept. 4, 1951

2,566,994

UNITED STATES PATENT OFFICE 2,566,994

RENEWABLE PUMP PISTON

John T. Phipps, Huntington Park, Calif., assignor, by mesne assignments, of one-third to himself, one-third to William F. Sturdivant, and one-third to Carl E. Phipps Application June 2, 1945, Serial No. 597,335

3 Claims. (Cl. 309—23)

This invention relates to pumps, and particularly pertains to a renewable pump piston.

In the use of reciprocating pumps, such for example as the sludge pumps used for pumping drilling mud in oil well drilling operations, the fluid being pumped is of high specific gravity and carries suspended solids which are gritty and abrasive. This condition also prevails in reciprocating oil well pumps in which the crude oil carries producing sand. In both of these instances it is difficult to provide a pump piston having rubber or deformable packing rings which will withstand the abrasion and maintain a pump seal efficiently for a period of time, which makes the pump operation economical. When packing rings used in oil well operations are examined it is found that they have worn away excessively along the marginal edges adjacent to the lips or flanges by which they are held. This appears to be due to the fact that since the packing rings are made of deformable material their marginal edges are not shaped and supported in a manner to allow a free flow of the deformable material to produce a seal without subjecting the ring to excessive abrasion.

It is the principal object of the present invention to provide a piston upon which one or more packing rings of deformable material may be mounted, said piston having a body portion to receive the rings, contiguous faces of the body portion and the rings being shaped to protect the rings and to afford maximum flexibility of the packing rings when acted upon by a compressed fluid and without subjecting the rings to excessive abrasive action.

It is another object of the present invention to provide a piston structure in which the piston body may be mounted upon a piston rod, conveniently and easily removed therefrom, and upon which piston body a plurality of packing rings and spacing elements may be detachably secured so that parts of the piston may be easily replaced.

It is a further object of the invention to provide means for easily withdrawing the various parts of the piston structure from their assembled positions.

The present invention contemplates the provision of a piston body adapted to be mounted upon a piston rod and having a central tubular section at one end of which an enlarged annular flange occurs, the outer surface of said body being formed in sections of different diameters whereby piston rings and spacing elements therefor may be assembled upon the body and positively held by a final cap and fastening members upon the piston rod.

The invention is illustrated by way of example in the accompanying drawings in which:

Figure 1 is a view in central longitudinal section showing the tapered end of a piston rod with the piston structure in place thereon.

Fig. 2 is a view in section showing one of the piston rings dissociated from the piston structure.

Fig. 3 is a view in end elevation showing the piston body with the rings and associated elements removed therefrom, as viewed in the direction of the arrow $a$ in Fig. 1.

Fig. 4 is a view in section and elevation showing the pulling device for the piston body.

Fig. 5 is a view in elevation showing a tool for removing the spacing ring and the packing cap of the piston ring.

Referring more particularly to the drawing, 10 indicates a pump piston rod. At the end of this piston rod is a tapered length of shaft 11 which terminates in a threaded cylindrical length 12. This receives lock nuts 13. Mounted upon the tapered end 11 of the piston is a piston body 14. This is formed with a central tapered bore 15 which corresponds in taper with that of the piston rod section 11 so that the piston body may be wedged onto the piston rod and held tightly by the nuts 13. At the end of the piston body 14 which is contiguous to the main length of the piston rod an annular flange 16 is formed. This flange has an outer circumference which is slightly less in diameter than the bore of a pump cylinder within which the piston reciprocates. This outer circumference is indicated at 17. The transverse face of the flange 16 which is presented toward the outer end of the piston rod is formed with a plurality of corrugations 18, the inner ends of which terminate with an annular rib 19 which extends circumferentially of the flange 16 and is spaced from a center hub 20 of the piston body. The corrugations, as shown in Fig. 3 of the drawing, are formed by faces 18$^a$ and 18$^b$ which are flat and are oppositely tapered. The faces are separated along radial lines 21 and 22. The radial lines or edges 22 are on different angles from the lines 21 although they both emanate from the outer circumferential edge of the rib 19. Due to this arrangement the corrugations have a scalloped perimeter, as indicated by the numerals 23 and 23'. The faces of these corrugations are complementary to the faces 18$^a$ and 18$^b$.

The annular rib 19 which circumscribes the hub 20 of the piston body forms an annular channel 24. The corrugated faces, represented generally at 18, are designed to form a seat for complementary corrugated faces on a packing ring 25. The end face of the ring resting against the corrugated surface 19 is also formed with an annular rib 26 which fits into the annular groove 24 on the piston body 14; and thus anchors the ring in position around the large diameter 20ª of the tubular portion 20. The large diameter 20ª fits within a bore 27 formed through the packing ring 25, and the annular rib 19 will act to hold the central portion of the packing ring 25 firmly in its seated position, so that it will not pull or tear out. The packing ring 25 is preferably formed of rubber and canvas. As shown in Fig. 2 of the drawing, canvas webbing 28 extends from within the annular rib 26 of the ring to an upper inclined face 29. Thus, the opposite ends of the canvas lie parallel to the axis of the ring and the intermediate portion lies obliquely thereto. The portion of the packing ring within which the corrugated face 18 is formed is indicated at 30 as comprising a desired grade of rubber, which is substantially triangular in section and continues at 30' to complete a rubber outer surface for the packing ring. A suitable backing section 31 made of rubber and fabric completes the ring structure. The end face of this backing section is inclined, as indicated at 32. Thus, the faces 29 and 32 are disposed at equal opposite angles to each other and form a V-shaped end face for the ring.

By reference to Fig. 1 of the drawing it will be seen that two of the packing rings 25 are provided, and that they are disposed with their corrugated faces 18' oppositely. These faces are therefore presented toward the opposite ends of the pistons. The V-shaped transverse faces represented by the surfaces 29 and 32 are contiguous to each other and fit within corresponding V-shaped grooves 33 of a center support and spacer 34. The tubular portion 20 of the piston body is formed with a reduced diameter 20ᵇ which extends through bore 35 of the spacing ring 34. Attention is directed to the fact that a face 36 on the spacing ring abuts against a transverse shoulder 37 at the end of the cylindrical portion 20ª, and that a face 38 on the spacing ring 34 is engaged by an end face 39 of a packing ring cap 40. The packing ring cap has a tubular portion 44 which fits over the cylindrical portion 20ᵇ of the body member. At the outer end of the cap 40 a flange 41 is provided, which is of the same dimensions and configuration as the flange 16 on the body member. Thus, this flange is formed with an inwardly presented corrugated face 18, as previously described, and engages the outermost packing ring 25. The end of the packing ring cap 40 is formed with a reduced bore 42 through which the threaded portion 12 of the piston rod extends. A packing washer 43 is interposed between the end of the tubular portion 20ᵇ and the bore of the piston ring cap which receives it. Attention is directed to the fact that the width of the spacing ring 34, as measured between its faces 36 and 37, is such as to insure that when its face 36 abuts against the shoulder 37 of the piston body member 14 the inner packing ring 25 will be firmly held without being unduly expanded and deformed. It will be seen that the face 39 is formed upon the end of a cylindrical extension 44 of the cap 40, and within which extension the portion 20ᵇ of the piston body telescopes. It is also provided that the length of the portion 44 of the packing ring cap 40 is such as to insure that when its face 39 abuts against the face 38 of the ring 34 the outer packing ring 25 will be firmly gripped without being objectionably deformed. The entire structure is then held with its parts in a rigid immovable relation to each other while being at the same time held upon the tapered section 11 of the piston rod 10. The holding action is created by the lock nuts 13. It will be seen that the lock nuts 13 may be tightened as desired to firmly wedge the piston body 14 on the tapered rod section 11, but that regardless of the holding pressure exerted by the nuts the gripping pressure exerted against the packing rings 25 will be constant. It should also be pointed out that due to the sectional construction of the packing rings 25 and their sectional contour the rings are limited against radial expansion and thus will not be forced outwardly against the piston walls beyond a predetermined amount.

In designing the rings it is desirable that the V-shaped base portion of each ring, as represented by the faces 29 and 39, shall have an overall outside diameter agreeing substantially with the outside diameter of the support and spacing ring 34, and that the contiguous shoulders 36, 37, 38 and 39 of the metal parts will be so designed as to create sufficient pressure to force the scalloped edges of the rubber portion of the packing rings 25 outwardly against the wall of a cylinder and slightly beyond the outer circumferential faces 17 of the flanges 16 and 41.

In order to remove the body portion 14 of the piston from its wedged position upon the tapered end 11 of the piston rod a special puller is desirable, as shown in Fig. 4 of the drawing. This puller includes a crosshead 45 formed with a central threaded bore 46. This bore receives a pressure screw 47 which is designed to abut against the end of the threaded portion 12 of the piston rod. The crosshead carries a plate 48 fitted with a pair of pulling rods 49. These rods are threaded at the outer ends and are fitted with nuts 50. The inner ends of the rods are inturned to form a finger 51. The fingers 51 may seat within recesses 52 formed in the outer circumference of the portion 20ᵇ of the piston body 14. Thus, when the fingers 51 engage the recesses and the end of the pressure screw 47 engages the end of the piston rod, the pressure screw may be manipulated to pull the piston body off of the rod. Prior to this operation it may be necessary to forcibly pull the spacing and supporting ring 34 from its seated position. In order to accomplish this the spacing ring is formed with a threaded bore 53 which receives the threaded end 54 of a pull rod 55. The opposite end of the rod is here shown as fitted with a ring-shaped handle 56. The same puller may be used to pull the packing ring cap 40 from the piston body 14 since it is formed with a threaded opening 57 to receive the threaded end 54 of the rod 55.

Attention is directed to the fact that each of the flanges 16 and 41 are formed along their corrugated faces 18 with an annular groove 58 which extends entirely around the flange and is here shown as being substantially semicircular in cross-section. Extending through the flanges with axes parallel to the longitudinal axis of the piston rod are a plurality of perforations 58' which communicate with the grooves 58. The perforations 58' allow pressure fluid to enter the grooves 58 and to exert pressure against the portions 30' of the packing rings, which tend to expand the relatively soft corrugated portion of the packing rings and to hold them against the cylinder wall. In the event that excessive fluid pressure is exerted it is obvious that the fluid would be forced outwardly and longitudinally between the corrugated faces of the flanges and the packing rings and back into the end of the cylinder from which they originally came. This produces an action entirely different from that in which fluid is conducted into a central chamber of a piston ring and expands the ring without any opportunity for excess fluid to be relieved.

In operation of the present invention the structure is assembled as shown in Fig. 1 of the drawing and is held in assembled position by the lock nuts 13. As previously stated, the longitudinal dimensions of the various rigid elements, including the body member 14, the spacing ring 34, and the packing ring cap 40, are selected to insure that the packing rings 25 will be firmly gripped, and that the portion 30' of each ring will be deformed slightly so that it will extend outwardly beyond the circumferential shoulders 17 of the flanges 16 and 41. As the piston reciprocates pressure will be exerted against the overhanging end portions of the faces 18ª and 18ᵇ of the corrugated surfaces 18. Thus, a compression action will be created along the feathered edges 23 and 23' of the rings to force them outwardly against the side wall of a pump cylinder to form a fluid seal therewith. This seal will be created by a yieldable corrugated area of the piston rings, which insures that the piston may operate for a long period of time without objectionable wear or abrasion. In fact, the presence of this corrugated surface at the end of the ring has produced a new and unexpected result, since in actual well operations the packing rings have a life many times that of conventional rubber rings which are of uniform thickness and have opposite end faces parallel to each other. This appears to be for the reason that the entire circumference of a conventional rubber pump ring is expanded against the side wall of a piston, thus increasing the contact area and friction between the ring and the cylinder wall, while in the present instance a relatively small feathered edge of the ring contacts the cylinder wall, which wall surface is indicated by the dotted line A in Fig. 1. As explained previously, reciprocation of the piston will produce alternate fluid pressure action through the openings 58' and the circumferential grooves 58. This action will tend to increase the sealing pressure of the deformable portion 30' of the packing rings. When it is desired to remove the piston the packing ring cap 40 is withdrawn after the lock nuts 13 are removed. This may require the use of the pull rod 45. If so, the threaded end 54 of the rod 55 is screwed into the opening 57, after which the packing cap may be pulled away from its seat. The spacing ring 34 is then removed in the same manner. It will be recognized that new rings may be easily placed upon the body member 14 after having thus been removed. In the event that the body member 14 is to be removed the pull rods 49 are placed with their fingers 51 in the recesses 52, after which they pass through clearance openings in the crosshead 45 and openings in the plate 48. The nuts 50 are suitably tightened and the pressure screw 47 is adjusted to abut against the end of the piston rod. As the screw 47 is tightened it will pull the piston body 14 from its seated position upon the tapered portion 11 of the piston rod 10.

It will thus be seen that the piston structure here disclosed embodies the use of simple parts, including deformable piston rings, all of which may be readily assembled upon a piston rod and held by nuts carried by the rod, and which parts may be easily dismantled when desired.

It will be further recognized that due to the peculiar corrugated formation of the end faces of the piston rings against which pressure is applied, and the complementary seats provided therefor, a tight fluid seal is obtained with minimum wear due to friction or abrasion.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. In combination with a piston rod having a longitudinally tapered end section terminating in a cylindrical threaded section upon which a nut may be placed, a piston having a body portion comprising a central tubular section formed with a central tapered bore, the outer surface of said tubular section comprising a cylindrical portion of relatively large diameter and a cylindrical portion of smaller diameter whereby an intermediate annular shoulder is formed, an enlarged disc-shaped flange formed upon the section of larger diameter and upon the opposite end thereof from said shoulder, an annular groove formed in the inner face of said flange, an outwardly flaring corrugated face upon said flange and extending circumferentially thereof, a deformable annular packing ring adapted to fit over the portion of the tubular member of large diameter and having one end face conforming in configuration with the groove and corrugations on the flange and against which said ring rests, oppositely inclined faces at the opposite end of said packing ring, a rigid removable spacing and supporting ring detachably mounted upon the length of the piston body of smaller diameter and having a face resting against the shoulder on the tubular body, a groove in the face of said ring conforming with and receiving the inclined faces of the packing ring, a complementary groove formed upon the opposite side of the spacing and supporting ring, a deformable packing ring having an end with inclined faces conforming with said groove and an opposite end with an annular bead and an inclined corrugated surface, a packing ring cap formed with a tubular portion extending through said last named packing ring and partially over the end portion of the reduced tubular section of the piston body, and an annular disc-like flange forming a part of said annular packing ring cap and resting against the corrugated end face of said second named piston ring, the tubular portion of said packing ring cap abutting against a face on the spacing ring providing a positive stop therefor, said packing ring cap being engaged by a nut on the piston rod to hold the entire assembled structure in a mounted position upon the piston rod.

2. A pump piston adapted to be mounted upon a piston rod, said piston comprising a body member having a central tubular section, a tapered bore formed centrally thereof to receive the tapered end of a piston rod, the outer circumference of said tubular section being formed with a length of relatively large diameter and a length of reduced diameter, an annular flange formed at the end of the length of large diameter and being disposed in a plane normal thereto, the diameter of said flange approximating the diameter of a cylinder within which the piston is designed to reciprocate, a series of radial corrugations formed on the inner face of said flange and defined by oppositely inclined plane faces, the contiguous edges of which faces lie in planes radial to the axis of the piston and tapering outwardly toward the outer face of the flange, an annular groove formed in the inner face of said flange and at the base of said corrugations, a deformable piston ring adapted to circumscribe the large portion of the body member and being of an outside diameter substantially agreeing with the diameter of the annular flange, the end of the ring abutting against the flange having a contour conforming to the corrugations and annular groove, the opposite end of said piston ring being defined by two annular surfaces converging outwardly toward each other, a spacing ring mounted upon the portion of the body member of reduced diameter and designed to rest against the shoulder of the portion of larger diameter, the opposite faces of said ring being formed with V-shaped grooves agreeing in configuration with the inclined faces of packing rings abutting thereagainst, the outer diameter of said spacing ring agreeing substantially in diameter with the outer diameter of the annular flange on the body member, a deformable packing ring formed with an angular face conforming to the V-shaped groove of the spacing ring and having a central bore agreeing in diameter with that of the first named packing ring, a packing ring cap having a cylindrical extension telescoping over the portion of reduced diameter of the body member to abut against the spacing ring and having an outside diameter agreeing with the bore of the second named spacing ring and into which said member extends, an annular flange at the outer edge of said cap agreeing in diameter with the annular flange on the body member and having a corrugated face and annular groove agreeing in configuration with similar parts on the annular flange of the body member and with which the contiguous end of the second packing ring conforms, said cap adapted to be engaged by a nut carried by a piston rod and acting in combination with the body member to positively hold the spacing ring in an intermediate position and to grip the packing rings whereby they will be held in position with the circumference of the rings adjacent to the corrugations being deformed and enlarged to a diameter greater than the diameters of the annular flanges and the spacing ring.

3. A deformable piston ring of the character described having concentric outer and inner walls, one end face of the ring being formed with a plurality of corrugations defined by oppositely extending plane faces, the contiguous edges of which are radial with the axis of the ring, said end face also having an annular protruding rib circumscribing the bore of the piston ring, the opposite end face of the ring being defined by complementary circumferentially extending plane surfaces converging outwardly to a median line at the center of the ring section, said ring being formed of deformable material having fabric reinforcement which extends axially of the annular rib and then diagonally and outwardly to a point contiguous to the outer circumference of the ring and then parallel to the said circumference, the portion of the ring between said fabric reinforcement and the corrugated end face of the ring being devoid of reinforcing material whereby it may deform readily under compression of the ring.

JOHN T. PHIPPS.

REFERENCES CITED

The following references are of record in the file of this patent:

UNITED STATES PATENTS

| Number | Name | Date |
|---|---|---|
| 289,776 | Luton | Dec. 4, 1883 |
| 1,227,457 | Langan | May 22, 1917 |
| 1,258,699 | Neumaier | Mar. 12, 1918 |
| 1,274,783 | Renard | Aug. 6, 1918 |
| 1,604,287 | Kibele | Oct. 26, 1926 |
| 1,678,365 | Sutliff | July 24, 1928 |
| 1,740,931 | McMahon | Dec. 24, 1929 |
| 1,744,565 | McMahon | Jan. 21, 1930 |
| 1,770,123 | Bettis | July 8, 1930 |
| 1,983,523 | Crowell | Dec. 11, 1934 |
| 2,013,903 | Thaheld | Sept. 10, 1935 |
| 2,211,454 | Failing | Aug. 13, 1940 |
| 2,249,400 | Shimer | July 15, 1941 |
| 2,306,800 | Caldwell | Dec. 29, 1942 |
| 2,388,520 | Bowie | Nov. 6, 1945 |
| 2,452,714 | Barnard | Nov. 2, 1948 |